(12) United States Patent
Drake

(10) Patent No.: US 11,498,395 B2
(45) Date of Patent: Nov. 15, 2022

(54) VEHICLE SUN SHIELD SYSTEMS

(71) Applicant: Claretha Drake, Fayetteville, NC (US)

(72) Inventor: Claretha Drake, Fayetteville, NC (US)

( * ) Notice: Subject to any disclaimer, the term of this patent is extended or adjusted under 35 U.S.C. 154(b) by 58 days.

(21) Appl. No.: 17/338,580

(22) Filed: Jun. 3, 2021

(65) Prior Publication Data
US 2021/0387512 A1 Dec. 16, 2021

Related U.S. Application Data

(60) Provisional application No. 63/037,718, filed on Jun. 11, 2020.

(51) Int. Cl.
*B60J 3/02* (2006.01)

(52) U.S. Cl.
CPC ........... *B60J 3/0265* (2013.01); *B60J 3/0208* (2013.01)

(58) Field of Classification Search
CPC ...... B60J 3/0208; B60J 3/0265; B60J 3/0204; B60J 3/02; B60J 3/023; B60J 3/0256; B60J 1/2019
USPC .................. 296/97.4, 97.6, 97.11, 97.8, 97.9
See application file for complete search history.

(56) References Cited

U.S. PATENT DOCUMENTS

| | | | |
|---|---|---|---|
| 4,874,938 A | 10/1989 | Chuang | |
| 5,165,748 A | 11/1992 | O'Connor | |
| 5,298,732 A | 3/1994 | Chen | |
| 5,427,427 A | 6/1995 | Holter | |
| 5,855,405 A | 1/1999 | Robles | |
| 6,279,984 B1 | 8/2001 | Reina, Jr. | |
| 6,371,546 B1* | 4/2002 | Jefferson | B60J 1/2011 296/97.8 |
| 6,402,221 B1* | 6/2002 | Ogunjobi | B60J 3/0208 296/97.8 |
| 6,412,850 B1 | 7/2002 | Francis | |
| 6,616,209 B1* | 9/2003 | Muyo | B60J 3/0208 296/97.4 |
| 8,246,099 B2* | 8/2012 | Lee | B60J 3/0208 296/97.4 |
| 2010/0201149 A1* | 8/2010 | Frotz | B60J 3/0208 296/97.4 |

* cited by examiner

*Primary Examiner* — Joseph D. Pape
*Assistant Examiner* — Veronica M Shull
(74) *Attorney, Agent, or Firm* — Michael C. Balaguy

(57) ABSTRACT

An auxiliary vehicle visor designed to provide improved protection against the sun's rays while driving or riding in a car. It includes a transparent tinted auxiliary component made from UV glass, which can be in a stored position or a downwardly extended position (for use). As designed, it allows the user to toggle between the stored position and the extended position with the push of a button or via mechanical means. The device expands the functionality of conventional sun visors to effectively block sunlight. The present invention reduces the vibrancy of the sunlight through the windshield to assist in preventing accidents.

7 Claims, 5 Drawing Sheets

VEHICLE SUN SHIELD SYSTEMS

CROSS-REFERENCE TO RELATED APPLICATION(S)

The present application is related to and claims priority to U.S. Provisional Patent Application No. 63/037,718 filed Jun. 11, 2020, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of vehicle visors and more specifically relates to an extendable sun shield system.

RELATED ART

Many individuals in modern society drive automobiles. These vehicles may comprise sun visors. Conventional sun visors do not fully protect the user from the sun, especially at peak sun times. This condition can cause the sun to impair the vision of the driver, and may result in an accident, in the very least, individuals will be squinting and will have a hard time driving. A suitable solution is desired.

Various attempts have been made to solve problems found in visor art. Among these are found in: U.S. Pat. Nos. 6,279,984; 5,165,748; 5,298,732; 4,874,938; 5,427,427; and 5,855,405. This prior art is representative of sun-shielding means.

None of the above inventions and patents, taken either singly or in combination, is seen to describe the invention as claimed. Thus, a need exists for a reliable sunshield system, and to avoid the above-mentioned problems.

SUMMARY OF THE INVENTION

In view of the foregoing disadvantages inherent in the known vehicle visor art, the present disclosure provides a novel vehicle sun shield system which advantageously fills the aforementioned deficiencies by providing efficient and effective sun shielding means for use in automobiles. The present invention is superior to other systems in that it effectively prevents glare from affecting the view of drivers during use.

The present invention provides an auxiliary vehicle visor designed to provide improved protection against the sun's rays while driving or riding in a car. It includes a transparent tinted auxiliary component made from UV glass, which can be in a stored position or a downwardly extended position (for use). As designed, it allows the user to toggle between the stored position and the extended position with the push of a button or via mechanical means. The device expands the functionality of conventional sun visors to effectively block sunlight. The present invention reduces the vibrancy of the sunlight through the windshield to assist in preventing accidents.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a vehicle sun shield system, constructed and operative according to the teachings of the present disclosure.

The various embodiments of the present invention will hereinafter be described in conjunction with the appended drawings, wherein like designations denote like elements.

DETAILED DESCRIPTION

Figure 1:
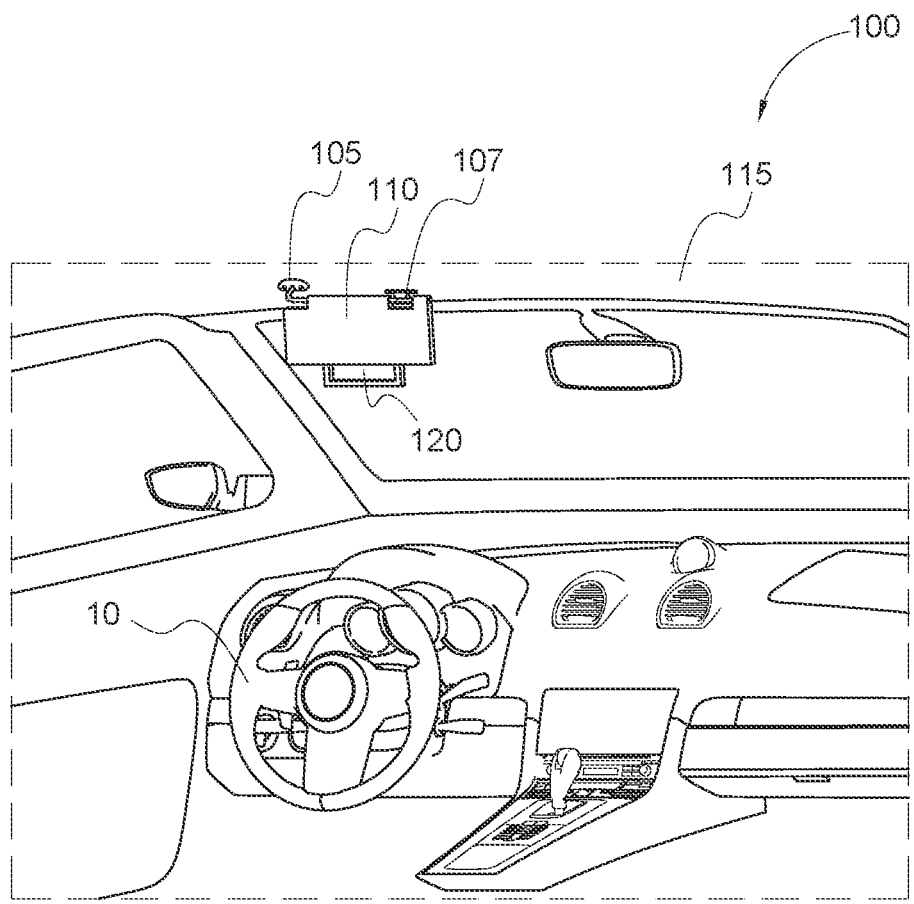
FIG. 1 is a perspective view of a vehicle sun visor, according to an embodiment of the present disclosure.

As discussed above, embodiments of the present disclosure relate to a vehicle visor and more particularly to a vehicle sun shield system as used to improve the ability of a driver to more fully shield themselves from solar radiation while driving.

Generally, the vehicle sun shade systems are a two-piece visor assembly with an visor shell (or visor body) which may pivot between a windshield and side window of an automobile, and an extension shield which may deploy out of the upper shield to expand the area of shielding. In a non-use condition, the extension shield is retracted into the visor shell. The extension shield may be electrically or mechanically operated with certain electronic embodiments having a button on the side that will activate the extension shield downward. Preferably, the extension shield is electrically operated by the push of a button, such that the extension shield deploys like a disc from a disc drive. The extension shield will have the capability to swivel and move about at least one axis proximate the bottom of the visor shell (forwardly-upwardly or downwardly-backwardly or swiveled left to right in relation to the windshield. Suitable pivot points and mechanical means such as universal joints may be employed. Additionally, the extension shield may be transparent and tinted. The novel apparatus protects the user from the morning sun and evening sun glare (bright light in the eyes of the driver that may impair safe driving), and during non-use conditions, it does not impede or obstruct the driver's vision. The directional arrows are provided to indicate possible direction(s) of travel of the retractable sunshield in relation to the visor (shell).

The sunshield is a device designed to properly block sunlight entering a vehicle to afford protection to the driver's and/or passengers' eyes. The invention in preferred embodiments is comprised of three separate pieces, a visor (with a shell), a side button (or other suitable manipulation means) and UV glass (retractable shield/extension shield). The device features an expandable glass that dims/reduces the glare reflected through the windshield. Pressing the button causes the sunshade to come down (from inside the visor shell) and pressing the button again will take the shield back (retract) into the stored position in electrical-manipulated embodiments. Mechanical versions may be manipulated). The sun shield may also have swiveling capabilities that allows it to rotate from side to side. The visor may be manufactured within new car models as OEM. Mechanical embodiments may comprise rods or the like that the user may hand-manipulate to pull the sunshield out in relation to the shell or push back in for non-use periods. The sunshield may be connected to the visor via any suitable means such as rods or linear members or the like. A button may be located on the shell of the visor. This button, when activated, may change the color of the retractable shield. The exact specifications, materials used, and method of use of the sunshield system may vary upon manufacturing.

Referring now more specifically to the drawings by numerals of reference, there is shown in FIGS. 1-4, various views of a vehicle sun visor assembly 100.

FIG. 1 shows the vehicle sun visor assembly 100, according to an embodiment of the present disclosure. Here, the vehicle sun visor may be beneficial for use by a user to control shielding of sunlight into a driver's eyes while operating a motor vehicle. As illustrated, the vehicle sun visor assembly 100 may include visor-body 110 and extension-shield 120. Extension-shield 120 is deployable from visor-body 110 and may be fully or partially concealed from sight by visor-body 110 when undeployed. The vehicle sun visor assembly 100 may be mounted to a ceiling 115 of vehicle 10 using swivel-mount 105 and clip-retainer 107. Each of swivel-mount 105 and clip-retainer 107 may be injection molded plastic components in some embodiments.

Figure 2:
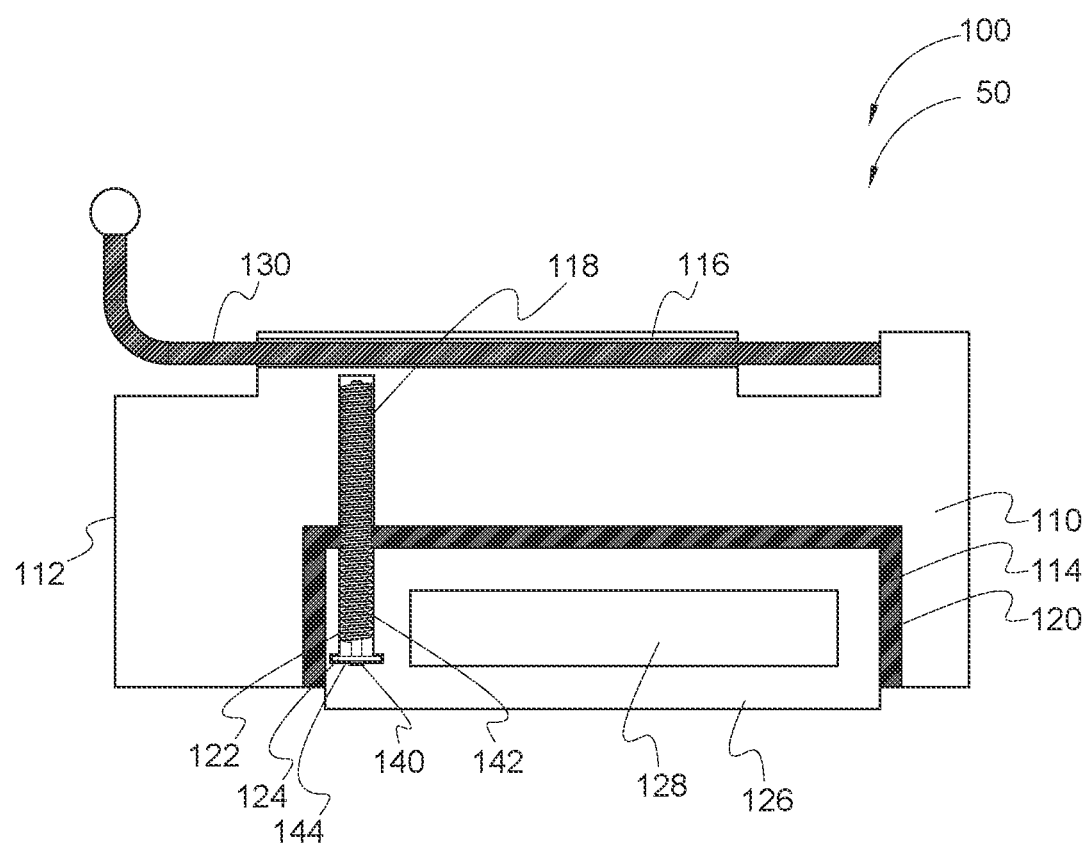
FIG. 2 is a cross-sectional view of the vehicle sun visor assembly of FIG. 1, according to an embodiment of the present disclosure, with the extension-shield in the undeployed position.

FIG. 2 shows the vehicle sun visor assembly 100 of FIG. 1, according to an embodiment of the present disclosure, with extension-shield 120 in undeployed position 50. Vehicle sun visor assembly 100 may include visor-body 110, extension-shield 120, shaft 140, and mount-rod 130. Visor-body 110 itself may be a unitary body characterized by exterior shell 112. Exterior shell 112 may have a rectangular profile, a thin thickness (less than ten percent of either the width or length of the rectangular profile), and one or more reliefs providing access to the mount-rod 130. Interior cavity 114 may be a rectangular slot having one rectangular opening along an edge (i.e. not coplanar with either the front or back rectangular profile), being large enough to accept and conceal most or all of extension-shield 120. First-cylindrical bore 116 may pass through visor-body 110 and is able to accept mount-rod 130. Second-cylinder bore 118 may be disposed perpendicularly to first-cylindrical bore 116, and may intersect interior cavity 114.

Extension-shield 120 may likewise be characterized by a rectangular profile, and may be perforated by third-cylindrical bore 122. Mount-rod 130 may be able to pass into and rotate within first-cylindrical bore 116. Shaft 140 may be able to pass through and rotate within second-cylindrical bore 118 and third-cylindrical bore 122 simultaneously. In this way, extension-shield 120 may be mechanically and pivotably connected to visor-body 110.

Shaft 140 may include leadscrew 142. Preferably, leadscrew 142 is integral to 140 but does not compose the entire length of shaft 140. In particular, leadscrew 142 does not need to be present where shaft 140 passes through extension-shield 120. However, leadscrew 142 must be present partially or fully where shaft 140 passes through and engages with second-cylindrical bore 118. Second-cylindrical bore 118 is internally threaded, such that second-cylindrical bore 118 is able to threadably engage with leadscrew 142. By this interaction, extension-shield 120 is advanced and alternately retarded as leadscrew 142 is turned depending on the direction of rotation.

Third-cylindrical bore 122 may be interrupted by collar-cavity 144 which widens the bore at one point, itself being cylindrical in shape also. Collar-cavity 144 may be expressed as a stepped bore, constricting abruptly into third-cylindrical bore 122 at either end as illustrated. Some embodiments may construct collar-cavity 144 at other end, with the other end being a terminus, as third-cylindrical bore 122 may be a blind bore. Collar-cavity 144 is arranged and dimensioned to contain and capture collar 124. Collar 124 is integral to or affixable to shaft 140. By these two relationships, shaft 140 can be retained within third-cylindrical bore 122 at a fixed relationship axially, but is still able to rotate along that axis freely. In this way, the extension-shield does not translate relative to the shaft. As leadscrew advances or retards out of second-cylindrical bore 118, extension-shield 120 must advance or retard equally with it, being driven by the engagement of collar 124 within collar-cavity 144.

In some embodiments, including the illustrated one, extension-shield 120 may be partially transparent so that an operator of vehicle 10 (FIG. 1) may see through it. In such an embodiment, extension shield includes frame 126 bounding window 128. Frame 126 must be sufficiently wide to house third-cylindrical bore 122 on one side. However, window 128 should comprise the largest percentage of extension-shield 120 as possible so that frame 126 does not unnecessarily impact the driver's view. Window 128 may be constructed of plexiglass in some embodiments and may also have a tint to reduce sun glare. Different colors of tint may be provided in varying embodiments. Yet further, a tint-color changing mechanism may be envisioned, whether by interchangeable window panes, a lighting mechanism, or other methods.

Figure 3:
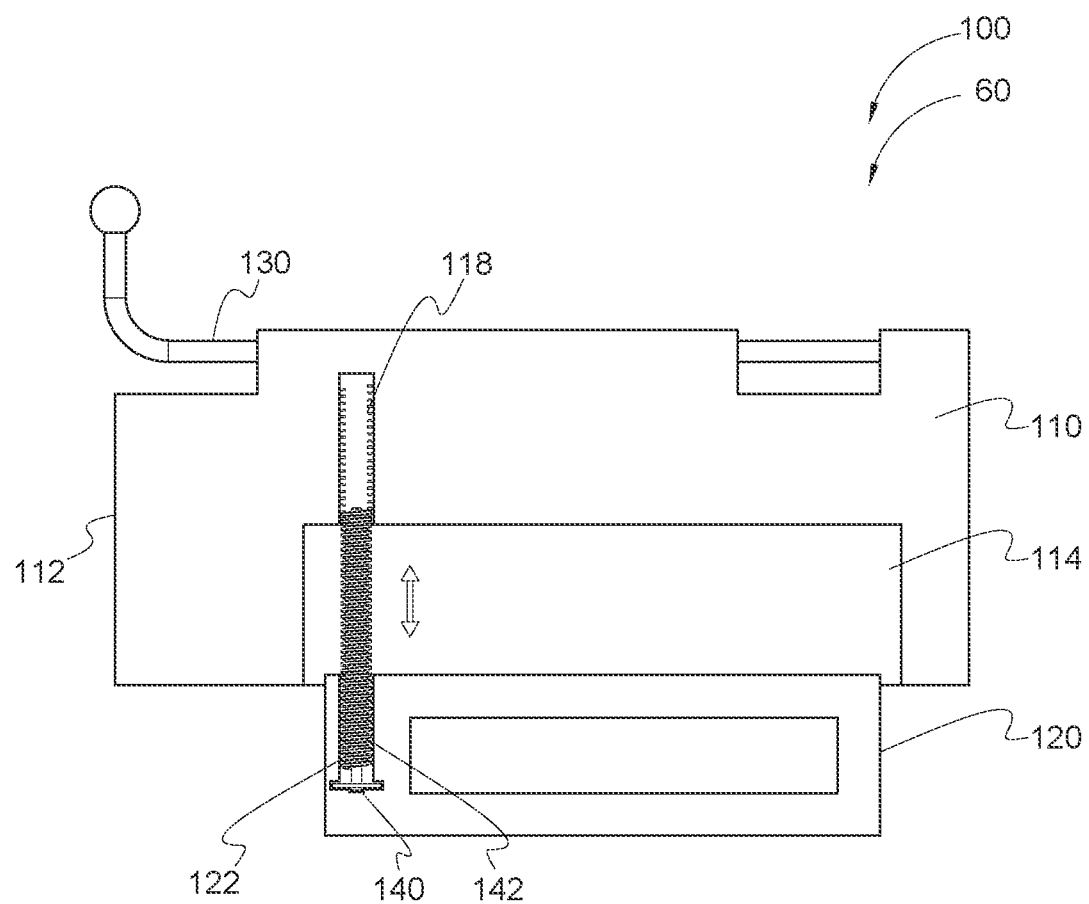
FIG. 3 is a cross-sectional view of the vehicle sun visor assembly of FIG. 1, according to an embodiment of the present disclosure, with the extension-shield shown in the deployed position.

FIG. 3 is a cross-sectional view of the vehicle sun visor assembly 100 of FIG. 1, according to an embodiment of the present disclosure, with extension-shield 120 in deployed position 60. As shown, leadscrew 142 of shaft 140 is almost fully threaded out from second-cylindrical bore 118. In some embodiments, stops engaging either leadscrew 142 or extension-shield 120 may mechanically prevent leadscrew 142 from fully disengaging with second-cylindrical bore 118. Additionally, guides may extension-shield 120 and support it in any degree of withdrawal from internal-cavity 114. As shown, internal cavity 114 may be largely empty when extension-shield 120 is in deployed position 60.

Figure 4:
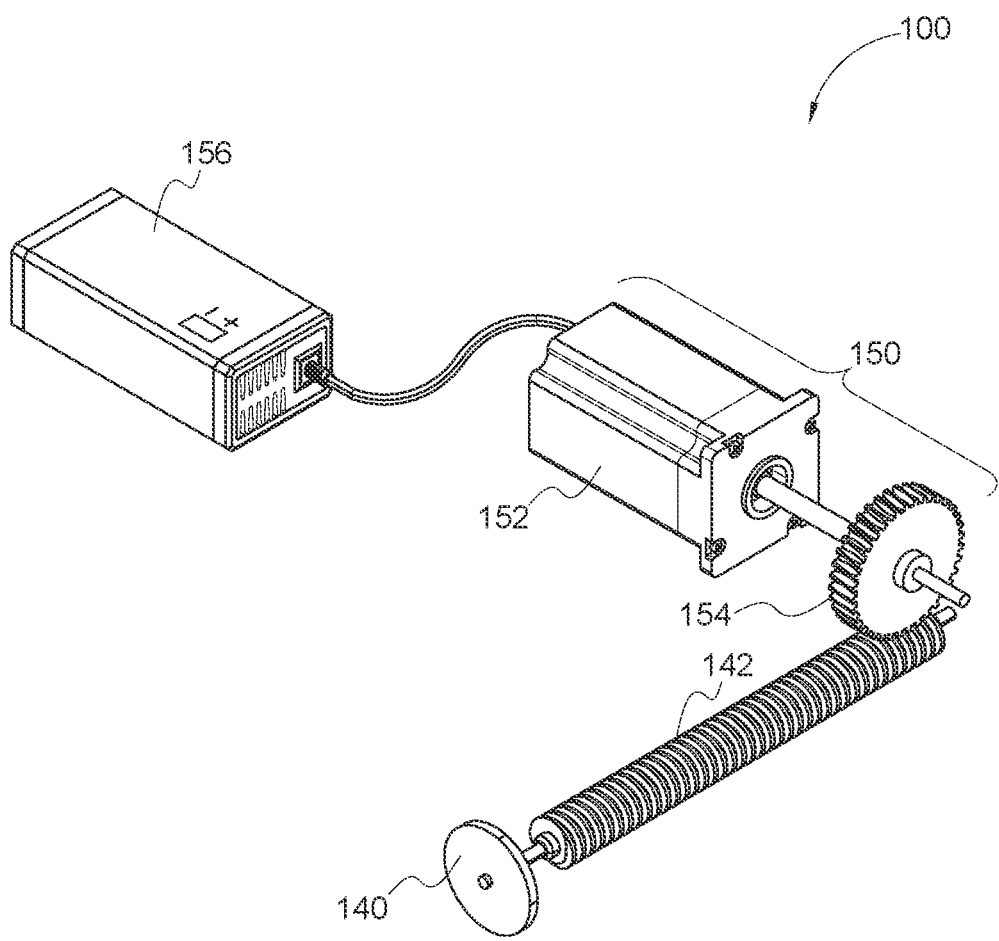
FIG. 4 is a perspective view of the internal motorized drive of the vehicle sun visor assembly of FIG. 1, according to an embodiment of the present disclosure.

FIG. 4 is a perspective view of the motorized drive 150 of the vehicle sun visor assembly 100 of FIG. 1, according to an embodiment of the present disclosure. Motorized drive 150 may include a direct-current motor 152 and gear 154. Gear 154 may directly engage with leadscrew 142 of shaft 140. Voltage source 156 may power direct-current motor 152, and may be a battery contained within the visor-body 110 (FIG. 2), a wired connection to the vehicle battery, or another voltage source. Motorized drive 150 housed within the visor-body 110 is thereby able to selectively turn shaft 140 in either direction.

Figure 5:
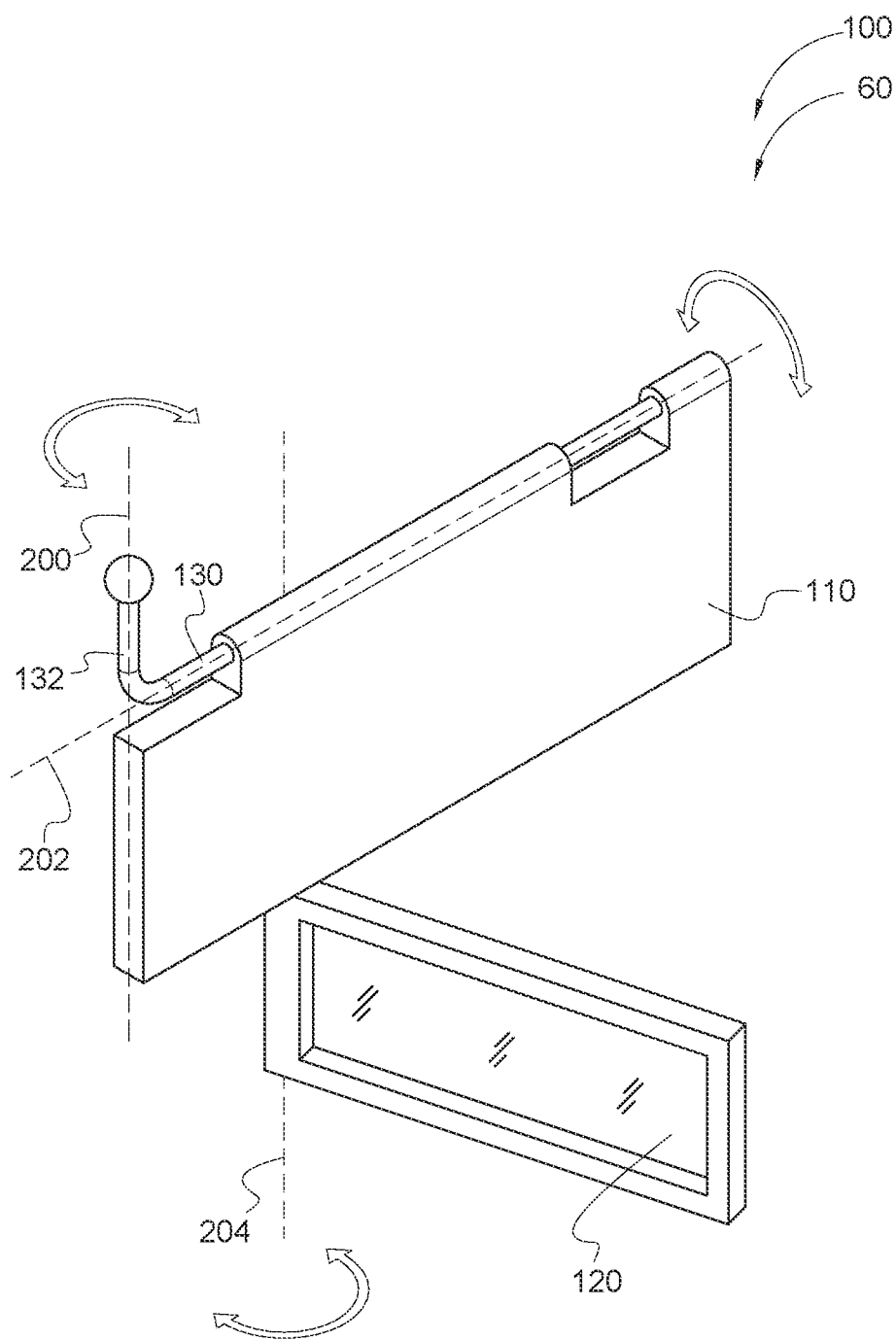
FIG. 5 is a perspective view of the vehicle sun visor assembly of FIG. 1 illustrating three axes of articulation, according to an embodiment of the present disclosure.

FIG. 5 is a perspective view of the vehicle sun visor assembly 100 of FIG. 1 illustrating three axes of articulation, according to an embodiment of the present disclosure. As shown, the vehicle sun visor assembly 100 is able to articulate through pivoting relationships between mechanical elements on three axes. Mount-rod 130 is bend, preferably at a ninety-degree angle. Accordingly, one end of mount-rod 130 comprises cantilever 132, which is affixed pivotably into swivel-mount 105. Thusly, the pivoting of cantilever 132 within swivel-mount 105 enables rotation upon first-axis 200. The pivoting of mount-rod 130 within first-cylindrical bore 116 (FIG. 2) enables rotation upon second-axis 202. Finally, the pivoting of shaft 140 (FIG. 2) within third-cylindrical bore 122 (FIG. 2) enables rotation of extension-shield 120 relative to visor-body 110 upon third-axis 204. However, extension-shield 120 is prevented from rotating relative to visor-body 110 unless fully deployed into deployed condition 60, as it is fitted within interior cavity 114 (FIG. 2) until leadscrew 142 (FIG. 2) is fully extended and extension-shield 120 is fully extended out of interior cavity 114 (FIG. 2).

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle sun visor comprising:
    a visor-body having
        an exterior shell having two parallel planar surfaces,
        an interior cavity disposed between the two parallel planar surfaces,
        a first-cylindrical bore,
        a second-cylindrical bore disposed perpendicularly to the first-cylindrical bore and intersecting the interior cavity,
    an extension-shield characterized by a rectangular profile, the extension-shield having
        a third-cylindrical bore,
    a mount-rod able to pass through and rotate within the first-cylindrical bore; and
    a shaft able to pass through and rotate within the second-cylindrical bore and the third-cylindrical bore simultaneously.

2. The vehicle sun visor of claim 1, wherein the extension-shield is transparent.

3. The vehicle sun visor of claim 2, wherein the extension-shield is tinted.

4. The vehicle sun visor of claim 1, wherein the shaft comprises a leadscrew and the second-cylindrical bore is internally threaded, such that the second-cylindrical bore is able to threadably engage with the leadscrew, and such that the extension-shield is advanced and alternately retarded as the leadscrew is turned counter-clockwise and alternately clockwise.

5. The vehicle sun visor of claim 4, further comprising a motorized drive housed within the visor-body able to selectively turn the shaft in either direction.

6. The vehicle sun visor of claim 5, further comprising a voltage source powering the motorized drive.

7. The vehicle sun visor of claim 4, wherein the shaft comprises a collar which is indexed to the extension-shield, such that when the extension-shield is advanced and alternatively retarded relative to the visor-body and the shaft rotates within the third-cylindrical bore, the extension-shield does not translate relative to the shaft.

* * * * *